United States Patent [19]
Boie

[11] Patent Number: 5,748,262
[45] Date of Patent: May 5, 1998

[54] METHOD OF DIGITIZATION OF INTERMEDIATE FREQUENCY SIGNALS IN PARTICULAR TELEVISION SIGNALS, AND DEVICE FOR IMPLEMENTATION OF THE METHOD

[75] Inventor: Werner Boie, Brigachtal, Germany

[73] Assignee: Thomson Multimedia S.A., Courbevoie, France

[21] Appl. No.: 645,765

[22] Filed: May 14, 1996

[30] Foreign Application Priority Data

May 23, 1995 [FR] France ................................. 95 06111

[51] Int. Cl.$^6$ ................................. H04N 5/44; H04N 5/46
[52] U.S. Cl. ......................... 348/726; 348/639; 348/554; 348/731
[58] Field of Search ................................. 348/726, 731, 348/639, 628, 554, 555, 556; H04N 5/44, 5/46, 5/445, 5/455

[56] References Cited

U.S. PATENT DOCUMENTS 4,502,078  2/1985  Steckler et al. ........................ 358/188

FOREIGN PATENT DOCUMENTS

| 0062872 | 4/1981 | European Pat. Off. | .......... H04B 1/30 |
| 0321681 | 12/1987 | European Pat. Off. | .......... H04N 5/46 |
| 0442578 | 2/1990 | European Pat. Off. | .......... H04N 5/44 |
| 0629040 | 12/1994 | European Pat. Off. | .......... H03D 1/22 |

*Primary Examiner*—Glenton B. Burgess
*Attorney, Agent, or Firm*—Joseph S. Tripoli; Frederick A. Wein

[57] ABSTRACT

A method of digitization of an intermediate frequency signal having a bandwidth that can change from one standard to another and of which one of the frequency limits of this band is substantially constant, wherein before converting the analog signal into a digital signal, the signals of the channels ($S_{if}^{N+1}$, $S_{if}^{N-1}$) adjacent to the frequency band of the signal to be digitized are eliminated in three stages: in a first stage, the signals ($S_{if}^{N+1}$) of channels adjacent to said substantially constant frequency limit are eliminated by filtering; in a second stage, the signal to be processed is transposed in frequency so that in the transposed signal the variable frequency limit of said band of the signal to be digitized has a substantially constant value; in a third stage, the signals of channels adjacent to the transposed signal are eliminated by filtering. The invention is applicable to the processing of digital IF video signals.

10 Claims, 3 Drawing Sheets

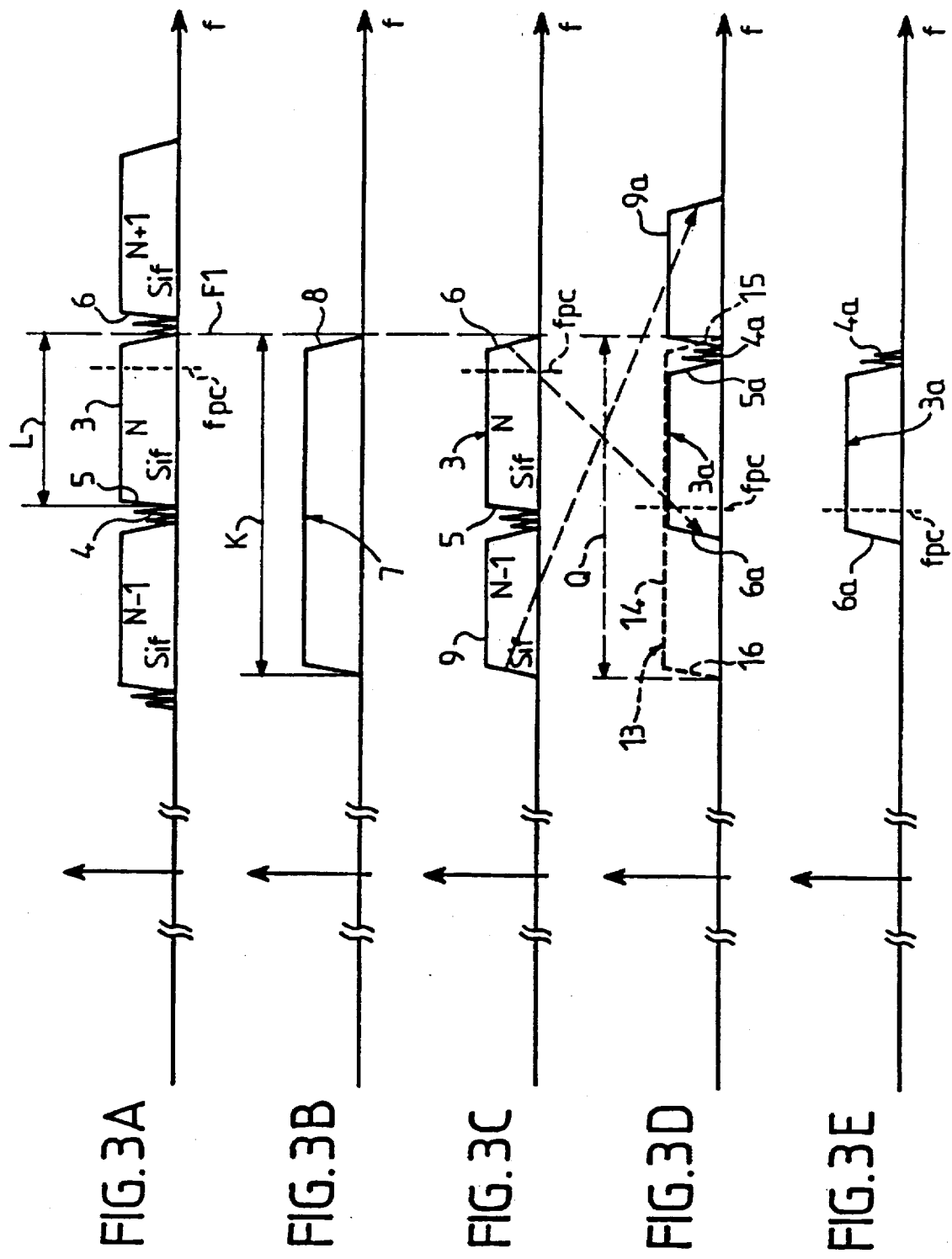

METHOD OF DIGITIZATION OF INTERMEDIATE FREQUENCY SIGNALS IN PARTICULAR TELEVISION SIGNALS, AND DEVICE FOR IMPLEMENTATION OF THE METHOD

BACKGROUND OF THE INVENTION

The invention relates to a method of digitization of intermediate frequency (IF) signals whose bandwidth can vary from one standard to another, one of the frequency limits of this band being substantially constant, the other limit being variable and depending on the standard in use.

The invention concerns more particularly, though not exclusively, IF television signals.

DESCRIPTION OF THE PRIOR ART

Techniques used in processing, filtering and demodulating digital signals are generally more flexible and less costly than analog solutions. Consequently, digital signal processing techniques generally provide better performance.

In particular, the application of digital techniques in modern television (TV) receivers offers many advantages such as a reduction in the complexity of the analog components, or the possibility of reconfiguring the receiver to be compatible with various TV standards without addition of extra equipment. Ultimately it might be possible to have a single "chip" circuit that can handle all the TV standards used worldwide. Other advantages might also be mentioned, such as the possibility of performing a filtering perfectly adapted to a particular standard, the possibility of using on-line correction algorithms, for example for the automatic gain control (AGC) or the automatic frequency control (AFC).

Several conditions must be satisfied in order to obtain satisfactory digital conversion of IF analog signals. First, a minimum level of dynamic resolution must be assured in order to be able to distinguish the signal sought from the signals of adjacent channels. If we consider an analog IF signal of about 40 MHz to be digitized, a minimum dynamic resolution of 10 bits, corresponding to 256 levels, is required in practice in order to provide sufficient discrimination. In practice, the signals of adjacent channels may have significantly higher amplitudes, up to 50 or 60 dB of the amplitude of the desired signal, in which case a higher dynamic resolution than that indicated previously is an advantage.

One major difficulty is related to the relatively high frequency of the IF signal (of the order of 40 MHz for television) and the sampling speed imposed by such a frequency. In this respect, the performance of analog-to-digital converters (ADC) currently available on the market at an acceptable price is insufficient. The graph shown in FIG. 1 relates, for example, to a flash-type ADC; it shows the effective (usable) number of bits at the output of the converter as a function of the frequency of the input signal, on a logarithmic scale. We see that such a converter provides 10 useful bits for low frequencies, but no more than about 5 bits for frequencies of around 40 MHz, a dynamic resolution insufficient to resolve our problem.

In addition, we should like the solution for digitization of the signals in question to be compatible with various standards for the devices considered. Notably, in the case of TV receivers, we should like the solution to be adaptable to the various TV standards used throughout the world.

This requirement for multi-standard compatibility is difficult to satisfy. If, in order to obtain good dynamic resolution, we decide to apply classical techniques to filter the desired signal to eliminate the signals of the adjacent channels, it is necessary either to use several filters adapted to the frequencies of the different standards, which would be very costly, or to use a single filter to filter signals whose frequencies do not match those for which the filter was designed, which implies less efficient filtering and poorer dynamic resolution.

At present there exist filters, notably SAW filters, suitable for high frequencies (greater than or equal to the IF) but that, at least for the moment, cannot be adapted to the lower frequencies acceptable to an ADC.

SUMMARY OF THE INVENTION

To resolve the problems caused by these contradicting requirements, the method according to the invention is a method of digitization of intermediate frequency (IF) signals, in particular television signals, having a bandwidth that can change from one standard to another and of which one of the frequency limits of this band is substantially constant, wherein before converting the analog signal into a digital signal, the signals of the channels ($S_{if}^{N+1}$, $S_{if}^{N-1}$) adjacent to the frequency band of the signal to be digitized are eliminated in three stages:

in a first stage, the signals ($S_{if}^{N+1}$) of channels adjacent to said substantially constant frequency limit are eliminated by filtering, choosing the filtering characteristics such that, whatever the bandwidth of the signal to be digitized (that may change from one standard to another), this signal to be digitized is not altered on its variable frequency limit side by the filtering;

in a second stage, said signal to be digitized is transposed in frequency, by an amount determined by its bandwidth, such that in the transposed signal the variable frequency limit of said frequency band of the signal to be digitized has a substantially constant value;

in a third stage, the signals of channels adjacent to the transposed signal are eliminated by filtering, choosing the filtering characteristics such that this transposed signal is not altered, whatever the bandwidth of the signal to be processed.

Using the method of the invention, with filtering characteristics established for given frequencies and bandwidths, we can process signals whose bandwidth changes from one standard to another, without having to modify the filters for each standard. The elimination of the signals or channels adjacent to the band of the signal to be processed enables the dynamic resolution to be improved without increasing the number of bits output by the ADC.

In the case of an IF television signal, the upper limit of the band is substantially constant in frequency. Consequently, in the first stage, we eliminate the signals of the adjacent channels of higher frequency than the signal considered, the filtering in this first stage being adapted to the largest bandwidth for the signal considered of all the possible TV standards.

After the three stages mentioned above, in order to digitize the signal it is advantageous to reduce the frequency of the signal to be processed before feeding it to an ADC.

The invention also includes a circuit for the implementation of the method of digitization defined previously, this circuit having an input that receives said signal to be digitized at an intermediate frequency from a tuning device, and including:

a first pass-band filter, of which one frequency limit corresponds to said substantially constant limit of the said frequency band of the signal to be digitized, to eliminate the signals of channels adjacent to this limit, this first filter being adapted to the largest bandwidth of all the possible standards in order not to alter said signal to be digitized, whatever standard is in use;

a mixer circuit to transpose the filtered IF signal into another frequency range, taking into account the standard of this signal and its bandwidth, and to make the variable frequency limit of said signal to be digitized substantially constant in the transposed signal;

a second pass-band filter of which one frequency limit corresponds to the value of said substantially constant frequency limit of the transposed signal, this second filter being adapted to eliminate the signals of the channels adjacent to this constant frequency limit of the transposed signal, the bandwidth of this second filter being adapted to the largest bandwidth of all the possible standards.

The two filters are advantageously SAW (surface wave) filters. The width of the pass-band of these filters is at least equal to the largest bandwidth of IF signals of all the possible standards.

Said mixer circuit preferably includes a multiplier circuit of which one input is connected to the output of said first filter and another input is connected to the output of a local oscillator generating a fixed frequency that can be adjusted according to the standard in use. Advantageously, the adjustment of this fixed frequency of the local oscillator is assured by an electrical voltage.

A frequency reduction circuit is included at the output of said second filter, this reduction circuit including a multiplier, of which one input is connected to the output of said second filter, and a local oscillator whose output is connected to another input of the multiplier; the frequency of this local oscillator can be adjustable to adapt it to the standard of the selected TV channel corresponding to the signal to be processed. A low-pass filter and an automatic gain control circuit are advantageously connected between the output of the frequency reducer and the input of an ADC.

The reduction of frequency is chosen such that the digitization assured by the ADC is of high precision.

BRIEF DESCRIPTION OF THE DRAWINGS

The invention will be better understood and other advantages and characteristics will become clear on reading the following description of an embodiment, taken only as a non-limitative example, making reference to the appended figures, of which:

FIGS. 3A to 3E illustrate the various stages of the method enabling the desired IF signal to be selected;

FIG. 2 shows a circuit for digitizing a television signal of intermediate frequency. The circuit includes a classical tuner 1 whose input is connected to an antenna 2 that picks up the signals to be processed. The tuner 1 includes a local oscillator adjusted to a frequency adapted to that of the signals picked up by the antenna 2 in order to create beats and provide at the output of the tuner 1 a signal whose frequency corresponds to the standardized value of the intermediate frequency which, for television, may be about 40 MHz.

FIG. 3A shows that the signal available at the output of the tuner 1 includes not only the desired signal $S_{if}^{N}$, corresponding to a given channel, but also signals corresponding to channels adjacent to this signal. For reasons of clarity, FIG. 3A shows only the signals corresponding to the next higher adjacent channel $S_{if}^{N+1}$ and the next lower adjacent channel $S_{if}^{N-1}$. This set of three signals forms a bandwidth of the first IF signal for the example considered.

Figure 1:
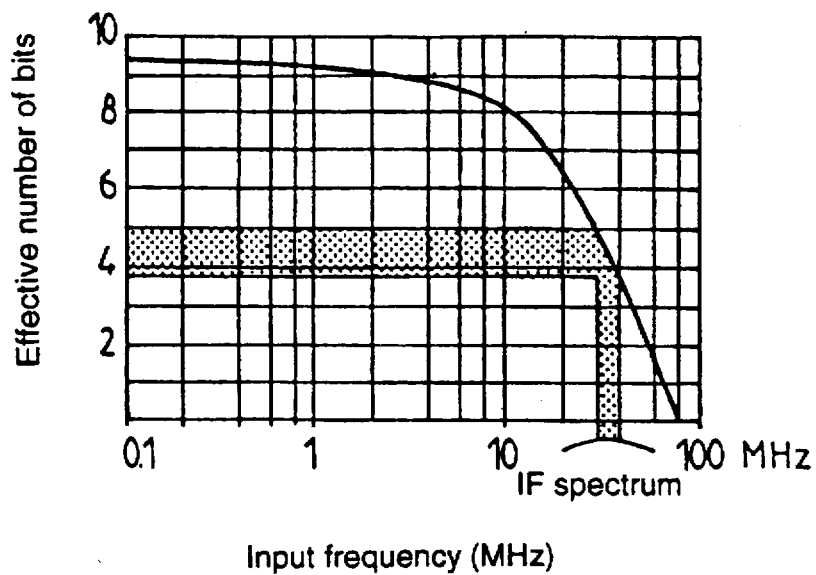
FIG. 1 is a graph showing the variation of dynamic resolution of a classical ADC; it shows the effective (usable) number of bits at the output by the converter as a function of the frequency of the input signal, on a logarithmic scale.

The vertical dashed line in FIG. 3A indicates the frequency of the image carrier $f_{pc}$ which falls within the band of the desired signal $S_{if}^{N}$.

The signal $S_{if}^{N}$ is represented schematically by a trapezoidal band 3, corresponding to the video band about the frequency $f_{pc}$ of the image carrier, and a sound band 4 that is narrower and situated just beneath the lower limit 5 of the band 3. The upper limit of the band 3 is designated by 6.

Note that the amplitudes of the signals of the adjacent channels $S_{if}^{N+1}$ and $S_{if}^{N-1}$ can be very much larger than those of the desired signal $S_{if}^{N}$, which implies precautions during processing, as mentioned earlier.

We find that the upper limit 6 of the band 3 of the desired signal $S_{if}^{N}$ is substantially constant in frequency, from one TV standard to another; on the other hand, the width L of the band 3 of the desired signal $S_{if}^{N}$ varies considerably from one standard to another, which means that the frequency of the lower limit 5 of the band 3 of the desired signal varies according to the TV standard.

A first pass-band filter 7 is chosen with an upper frequency limit 8 corresponding to the substantially constant limit 6 of the band 3 of the signal $S_{if}^{N}$ to be digitized. The characteristics of the pass-band of the filter 7, substantially in form of rectangular window, are illustrated in FIG. 3B. The filter 7 is adapted to the various TV standards, in other words the filter 7 has a pass-band of width K (see FIG. 3B) at least equal to the largest bandwidth L of the different standards used throughout the world, for the channel corresponding to the desired signal.

In these conditions, the signals $S_{if}^{N+1}$ of the adjacent channels above the limit 6 will be eliminated by the filter 7. In addition, whatever the TV standard used, we are sure that the whole of the band 3 of the desired signal $S_{if}^{N}$ will be transmitted without being cut off by the filter 7, since the pass-bandwidth K of this filter is at least equal to the largest bandwidth L of all the possible TV standards.

However, the signal at the output of the filter 7 includes not only the desired signal $S_{if}^{N}$ but also a signal corresponding to the lower adjacent channel $S_{if}^{N-1}$, since the bandwidth K of the filter 7 is, for most standards, greater than the width L of the band 3.

The signal at the output of the filter 7 is represented in FIG. 3C; it includes the desired signal 3 ($S_{if}^{N}$) and a part 9 of the lower adjacent signal $S_{if}^{N-1}$.

The filter 7 is advantageously a SAW filter, commercially available and functioning perfectly at intermediate frequencies of the order of 40 MHz. Today such SAW filters offer a good performance-to-price ratio and a particular attractive solution for filtering problems. However, as mentioned earlier, these SAW filters do not function satisfactorily for frequencies much less than IF frequencies.

Figure 2:
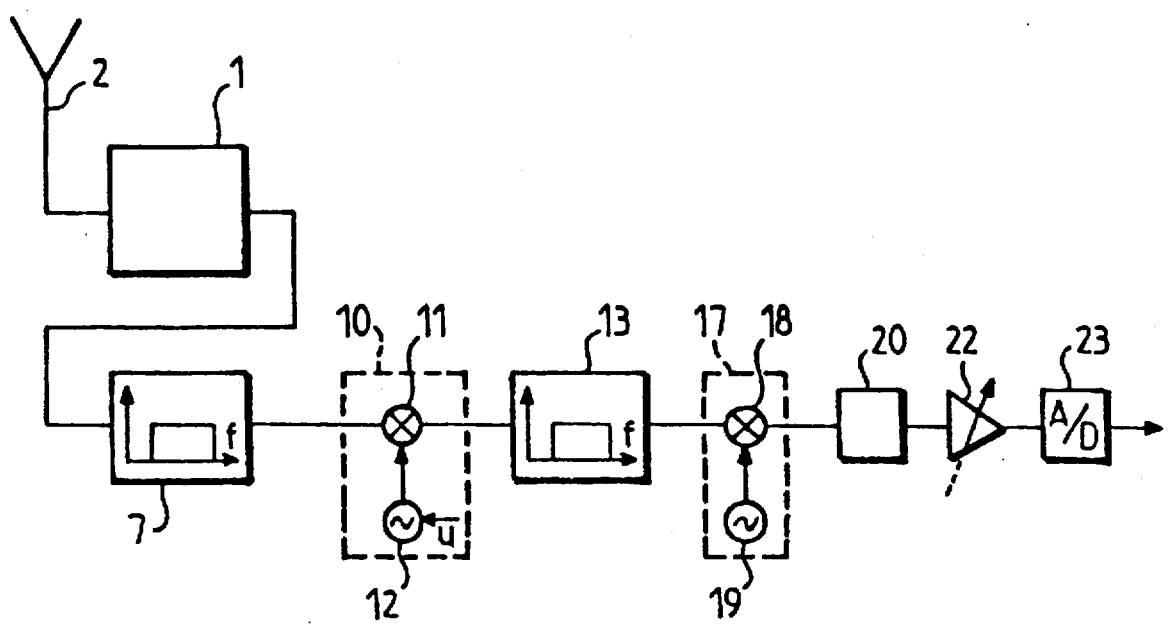
FIG. 2 is a block diagram of a circuit that implements the method according to the invention.

Referring again to FIG. 2, we see that the output signal of the filter 7 is fed to the input of a mixer circuit 10 suitable for transposing the IF signal filter, illustrated in FIG. 3C into another frequency range, taking account of the standard of the signal $S_{if}^{N}$ and its bandwidth. The mixer circuit 10 includes a multiplier circuit 11 receiving on an input the output signals from the filter 7 and of which another input is fed by a local oscillator 12 at a fixed frequency $f_{Lo}$. The frequency of the oscillator 12 can be modified by means of a voltage U applied to the oscillator 12, in order to adapt the fixed frequency $f_{Lo}$ to the TV standard concerned.

The effect of transposition produced by the mixer circuit 9 is illustrated by the transition between FIGS. 3C and 3D. This transposition includes a frequency shift with a mirror effect resulting in an inversion of the positions of the channels, as shown by the dashed arrows going from FIG. 3C to FIG. 3D.

More precisely, we see that when we move from FIG. 3C to FIG. 3D (i.e. when moving from the input to the output of the circuit 10) the frequency $f_{pc}$ has been lowered by a value that depends on the frequency of the local oscillator 12. In addition, the band 3 of the signal that we wish to digitize has been rotated through 180° about an axis parallel to the ordinate axis and has become 3a. The lower limit 5 of the band 3 becomes the upper limit 5a of the band 3a, and inversely for the upper limit 6 that becomes the lower limit 6a.

The signal 9 adjacent to the lower limit of the signal to be processed in FIG. 3C becomes 9a on the other side of the transposed signal 3a to be processed and becomes adjacent to the upper limit 5a of the transposed signal 3a shown in FIG. 3D. The parameters of the mixer circuit 10 are chosen such that the upper limit 5a, indicated in FIG. 3D, of the band of the signal to be processed, corresponds to a substantially constant frequency, whatever the TV standard. This frequency can be the same as the frequency F1, corresponding to the upper limit of the signal $S_{if}^N$ of FIG. 3A, or can be different.

The total signal, represented by a solid line in FIG. 3D, comprising the signal to be processed and a higher adjacent signal to be eliminated, is fed to the input of a second pass-band filter 13, which is advantageously also a SAW filter.

The pass-band of this second filter SAW is represented by a substantially rectangular window 14, shown by a dashed line in FIG. 3D. The upper limit 15 corresponds to the substantially constant value of the upper limit 5a of the transposed signal to be processed, possibly taking into account the sound band 4a, such that the limit 15 can be slightly greater than the limit 5a. The essential point to note is that the limit 5a remains substantially constant, whatever TV standard is used, so the filter 13 whose limit 15 is also constant can be used for all TV standards.

The width Q of the pass-band of the second filter SAW is chosen such that the signal to be processed is not altered by the second filter 13, whatever the TV standard. In other words, we choose the bandwidth Q such that in all cases, whatever the standard, the lower limit 16 of the pass-band 14 of the second filter 13 is less than the lower limit 6a of the signal to be processed.

At the output of the filter 13, we obtain the signal to be processed separated from the signals of the adjacent channels which were present in FIG. 3A. The shape of the signal 3a obtained, shown in FIG. 3E, is symmetric about an axis parallel to the ordinate axis with respect to the signal shown in FIG. 3A, owing to the mirror effect explained earlier.

The selected IF signal, shown in FIG. 3E, provides good dynamic resolution because it is no longer encumbered with parasitic signals from the adjacent channels. Such as signal could be obtained for any TV standard without having to modify the filters 7 and 13, the adaptation being made only at the local oscillator 12, using a voltage U to adjust the transposition effect corresponding to the transition from FIG. 3C to FIG. 3D.

However, the frequency of the signal obtained at the output of the filter 13 is too high to be handled with sufficient dynamic resolution by current ADCs of reasonable price.

Figure 4A:
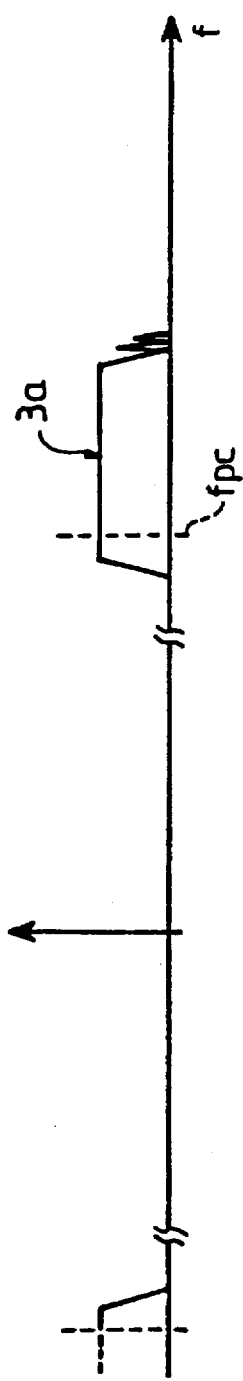
FIGS. 4A to 4D illustrate the frequency reduction of the desired IF signal.
Figure 4B:
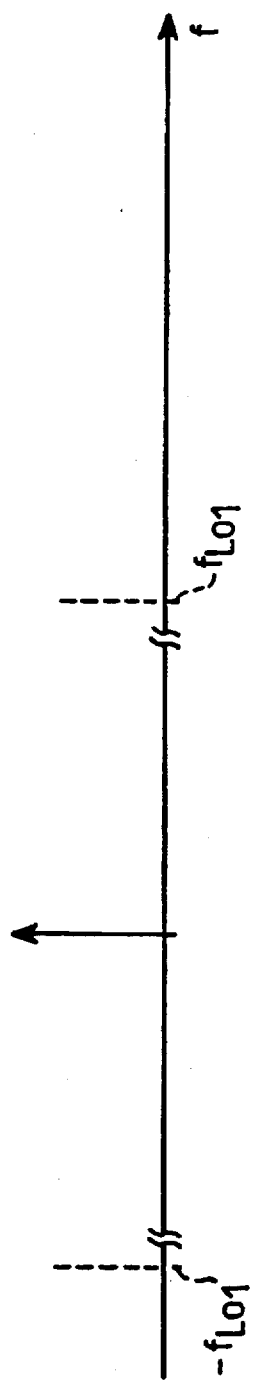
Figure 4C:
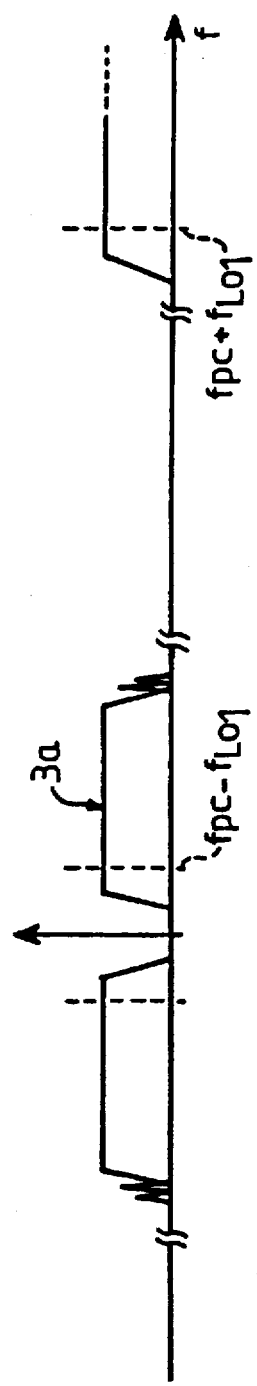

The output signal 3a of the filter 13, shown schematically in FIG. 4A, is therefore fed to a converter circuit 17 to lower the frequency. This converter circuit 17 includes a multiplier 18 of which one input is connected to the output of the filter 13 and another input receives the output signal from an oscillator 19 at local frequency $f_{Lo1}$. The frequency $f_{Lo1}$ of this oscillator 19, illustrated in FIG. 4B, is constant and preferably adjustable according to the standard of the chosen TV channel.

Note that in FIGS. 4A to 4D, the signals in the right-hand part of figures correspond to positive frequencies, and the signals symmetric about the ordinate axis correspond to negative frequencies in a mathematical representation of the signals.

Figure 4D:
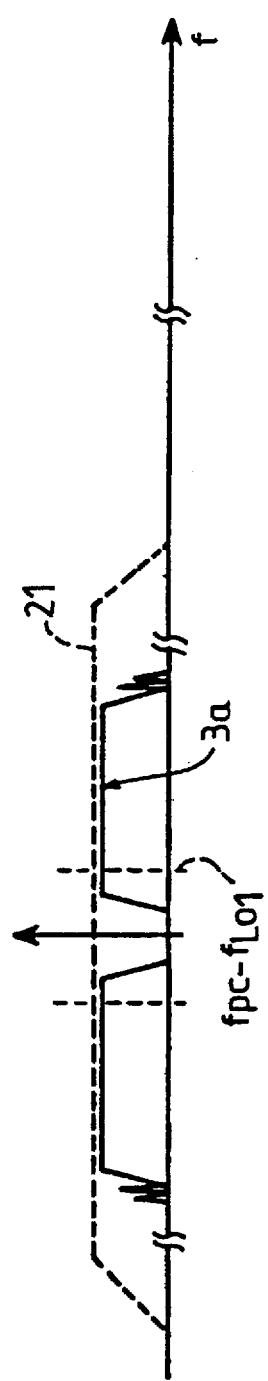

The output signal from circuit 17, at lowered frequency $(f_{pc}-f_{Lo1})$ (see FIG. 4C), is fed to the input of a low-pass filter 20 whose pass-band 21 is shown as a dashed line in FIG. 4D. This low-pass filter removes all the radiofrequency components from the signal. The signal output from the filter 20, after passing through an AGC circuit 22, is fed to the input of an ADC 23. Thanks to the lowering of the frequency of the signal fed to this converter 23, satisfactory digitization of the analog signal can be achieved at an acceptable sampling frequency and with good dynamic resolution, whatever the TV standard.

The frequency of the input signal of the converter 23 being relatively low, the sampling frequency can be greater than twice the maximum frequency of the input signal from the tuner 1, which favors good resolution.

The invention leaves a wide choice of sampling frequency and frequency of the local oscillator 19.

In the preceding description we have considered in particular a video signal. However it is clear that a parallel architecture, after selection of the IF signal, is possible for the demodulation of the sound signal.

What is claimed is:

1. Method of digitization of signals, having a bandwidth that can change from one standard to another and of which one of the frequency limits of this band is substantially constant, wherein before converting the analog signal into a digital signal, the signals of channels ($S_{if}^{N+1}$, $S_{if}^{N-1}$) adjacent to the frequency band of the signal to be digitized are eliminated in three steps comprising:

in a first step, signals ($S_{if}^{N+1}$) of channels adjacent to said substantially constant frequency limit are eliminated by filtering, the filtering characteristics being that whatever the bandwidth of the signal to be digitized that may change from one standard to another, this signal to be digitized is maintained on its variable frequency limit side by the filtering;

in a second step, said signal to be digitized is transposed in frequency, by an amount determined by its bandwidth, such that in the transposed signal, the variable frequency limit of said frequency band of the signal to be digitized has a substantially constant value; and in a third step, the signals of channels adjacent to the transposed signal are eliminated by filtering, choosing the filtering characteristics such that this transposed signal is maintained, whatever the bandwidth of the signal to be processed.

2. Method of digitization according to claim 1 of a signal whose upper frequency limit is substantially constant, wherein in said first step the signals ($S_{if}^{N+1}$) of the adjacent channels of frequency higher than said signal ($S_{if}^{N}$) are eliminated, the filtering during this first step being adapted to the bandwidth of said signal which may be different from one standard to another.

3. Method of digitization according to claim 1, wherein after execution of said three steps and before digitizing the resulting signal, the frequency of this signal is reduced before being fed to the input of an analog-to-digital converter.

4. Circuit for the digitization of signals having an input that receives said signal to be digitized comprising:

- a first pass-band filter, of which one frequency limit corresponds to a substantially constant limit of the frequency band of the signal to be digitized, to eliminate the signals of channels adjacent to this limit, this first filter being adapted to the largest bandwidth of all the possible standards in order not to alter said signal to be digitized;

- a mixer circuit to transpose the filtered signal into another frequency range taking into account the standard of this signal and its bandwidth, and to make the variable frequency limit of said signal to be digitized substantially constant in the transposed signal;

- a second pass-band filter of which one frequency limit corresponds to the value of said substantially constant frequency limit of the transposed signal, this second filter being adapted to eliminate the signals of the channels adjacent to this constant frequency limit of the transposed signal, the bandwidth of this second filter being adapted to the largest bandwidth of all the possible standards.

5. Circuit according to claim 4, wherein said first and second filters are SAW (surface acoustic wave) filters.

6. Circuit according to claim 4, wherein the widths of the pass-bands of said first and second filters are at least equal to the largest bandwidth of signals of all the possible standards.

7. Circuit according to the claim 4, wherein said mixer circuit includes a multiplier circuit of which one input is coupled to the output of said first filter and another input is coupled to the output of a local oscillator generating a fixed frequency that can be adjusted according to the standard used.

8. Circuit according to claim 7, wherein the adjustment of said fixed frequency of said local oscillator is provided by an electrical voltage.

9. Circuit according to the claim 4, that includes a frequency reduction circuit at an output of said second filter, this reduction circuit including a multiplier of which one input is connected to the output of said second filter and a local oscillator whose output is coupled to another input of the multiplier.

10. Circuit according to claim 9, wherein a low-pass filter and an automatic gain control circuit are coupled between an output of said frequency reducer and an input of an analog-to-digital converter.

* * * * *